Jan. 21, 1958
S. L. CROWELL
2,820,471
VALVE MECHANISMS FOR MAGNETIC FLUID CONDUITS
AND DEVICES EMPLOYING THE SAME
Filed July 31, 1953
2 Sheets-Sheet 1
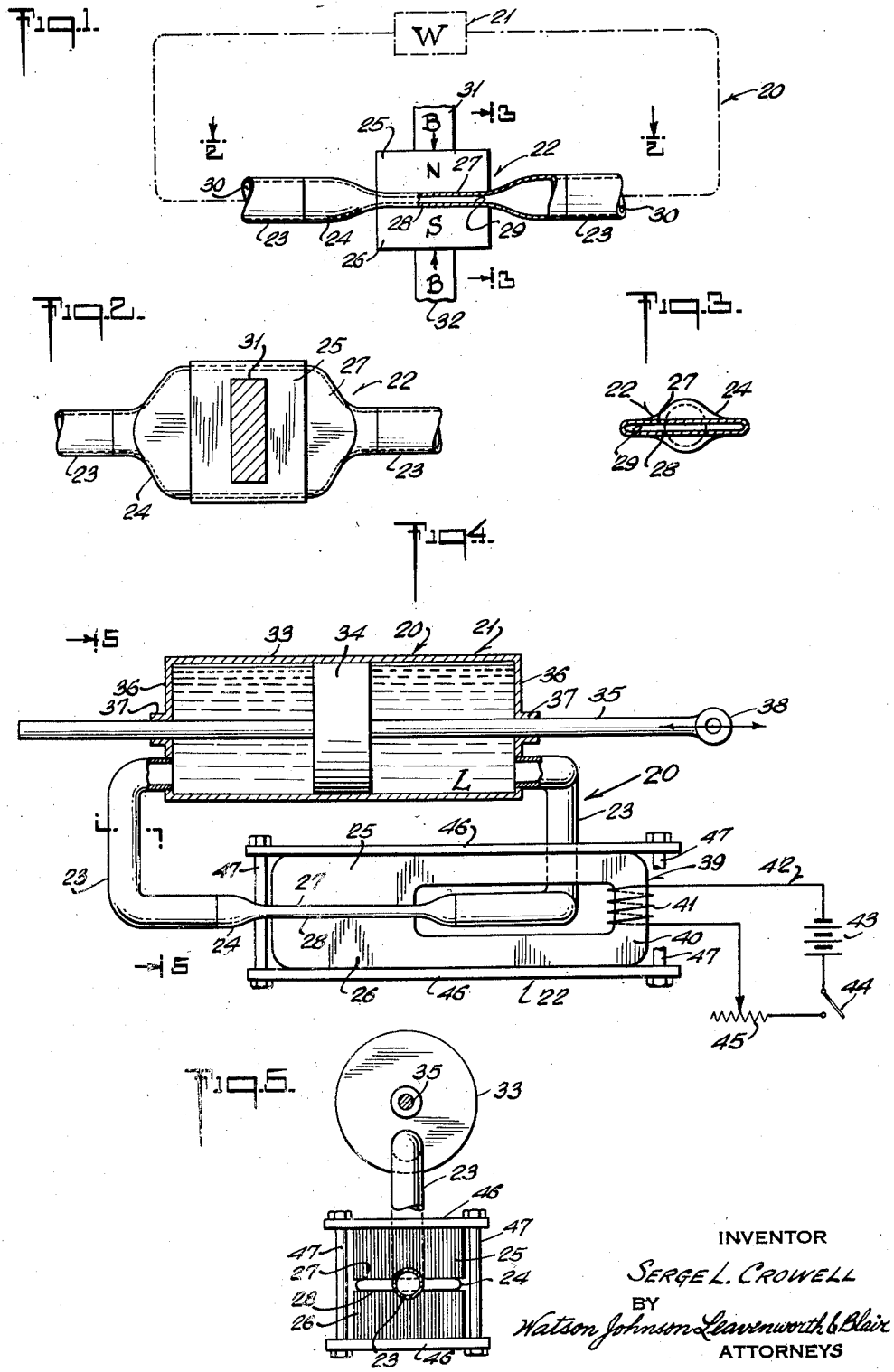
INVENTOR
SERGE L. CROWELL
BY
Watson Johnson Leavenworth & Blair
ATTORNEYS

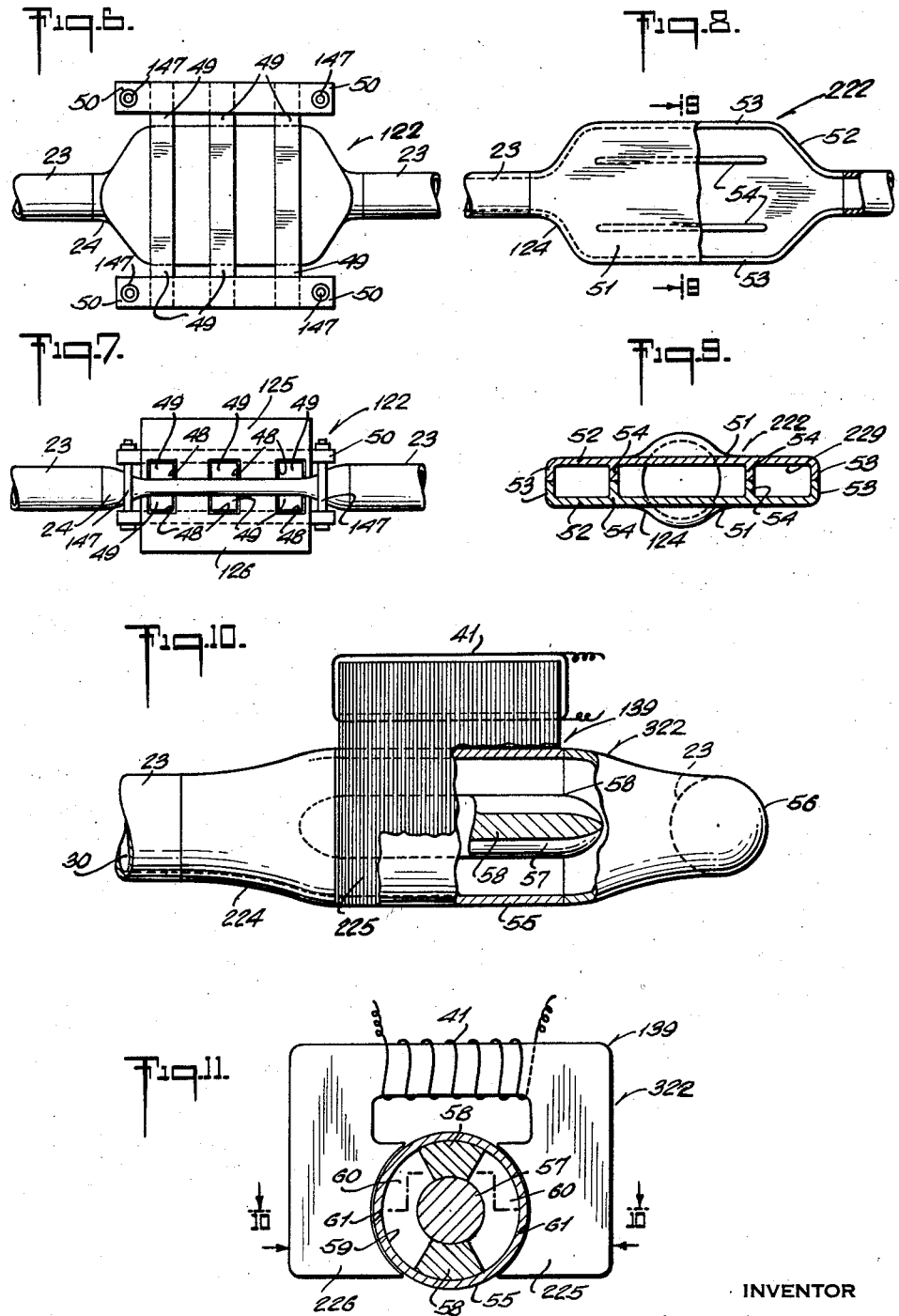

# United States Patent Office 2,820,471
Patented Jan. 21, 1958

2,820,471

VALVE MECHANISMS FOR MAGNETIC FLUID CONDUITS AND DEVICES EMPLOYING THE SAME

Serge L. Crowell, Garden City, N. Y.

Application July 31, 1953, Serial No. 371,702

6 Claims. (Cl. 137—251)

The present invention relates to valve mechanisms for magnetic fluid conduits and to uses thereof, for example, shock absorbers.

A general object of the present invention is to provide such valve mechanisms for magnetic fluid conduits which are readily and economically produced on a mass production basis and easily assembled and installed to allow efficient "valving" of the flow of magnetic fluids therethrough by means of controls in the electrical circuits of electromagnets of such valve mechanisms; such valve mechanisms featuring location of the opposed magnetic poles to cause the lines of flux to traverse the path of flow substantially normal thereto to attain the valving effect with flow in either direction and preferably minimized spacing of the magnetic poles for greatest effectiveness of the magnetic field.

A more specific object of the present invention is to locate in such valve mechanisms the magnetic poles on opposite sides of a duct for the magnetic fluid so that the flux lines pass across the path of flow substantially normal thereto and with the diamagnetic portions of the paths of flux lines which traverse the flow path being substantially equal to effect substantially uniform distribution of the flux lines to obtain substantially equal flux density throughout the space intervening the pole faces for efficient valving effect along a section of the duct of considerable length.

Another object of the present invention is to provide in such valve mechanisms conduit structure so shaped as to provide opposed side walls in relatively close spaced relation for minimizing the lengths of the paths of flux lines, associated with biasing means to resist tendency for the opposed walls to be separated by relatively high fluid pressures of liquid medium passing through the valve mechanisms.

A further object of the present invention is to provide such valve mechanisms in forms intended to orient the paths of flow substantially horizontal so as to avoid difficulties which may result from uneven settling of paramagnetic particles from the liquid medium during periods of deenergization.

Still another object of the present invention is to provide in such valve mechanisms duct sections which have the flow spaces therein of a cross-sectional area at least as great as the passage through conduit leading to and from said section so as to avoid undue physical throttling effect.

And another object of the present invention is to provide structural embodiments of the device which are readily constructed and allow efficient use and operation thereof.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

Fig. 1 is a diagrammatic showing of a closed circuit embodiment of the present invention depicting in elevation, with parts broken away and in section, one form of the present valve mchanism;

Fig. 2 is a top plan view of the valve mechanism structure shown in elevation in Fig. 1;

Fig. 3 is a sectional view taken substantially on line 3—3 of Fig. 1;

Fig. 4 is a side elevational view, with parts broken away and in section, of an embodiment of the present invention as employed in shock absorbers of the dashpot type with the electrical control circuit thereof being diagrammatically indicated;

Fig. 5 is a sectional view taken substantially on line 5—5 of Fig. 4;

Fig. 6 is a plan view similar to Fig. 2 of another embodiment of the valve mechanism of the present invention;

Fig. 7 is a side elevational view of the structure shown in Fig. 6;

Fig. 8 is a plan view, with parts broken away and in section, of a further embodiment of the valve mechanism of the present invention;

Fig. 9 is a sectional view taken substantially on line 9—9 of Fig. 8;

Fig. 10 is an enlarged side elevational view, with parts broken away and sectioned substantially on line 10—10 of Fig. 11, of still another embodiment of the valve mechanism of the present invention; and Fig. 11 is an elevational section of the structure shown in Fig. 10.

Referring to the drawings in which like numerals identify similar parts throughout, it will be seen from the diagrammatic showing in Fig. 1 that an embodiment of the present invention may comprise, by way of example, the following basic elements. A closed conduit circuit is indicated by dot-dash lines at 20 and includes a work unit at 21 where applied load is to be opposed by liquid pressure in the conduit circuit, and a valving assembly at 22 to control and vary flow of liquid in the closed circuit from one side of work unit 21 to the other. The present invention is chiefly concerned with the valving assembly at 22, different views of which are shown in Figs. 2 and 3. The conduit extending between the work unit 21 and the valving assembly 22 may comprise suitable tubing 23, preferably of non-ferrous or diamagnetic material, such as copper or brass. The tubing 23 has therein a duct section 24 of diamagnetic material on opposite sides of which are arranged two poles 25 and 26 of an electro-magnet to provide magnetic flux or a magnetic field of force thereacross. The ends of the duct section 24 are suitably connected to the juxtaposed ends of tubing 23 by any suitable means, such as by brazing.

In accordance with the present invention the space between the magnetic poles 25 and 26 is to be minimized without undue physical throttling of liquid flow through the conduit circuit. As will be seen from Figs. 1, 2 and 3, this may be accomplished by flattening out a portion of section 24 so that opposite walls 27 and 28 of that portion are brought relatively close together. However, in order to avoid undue physical throttling the opposed, closely spaced walls 27 and 28 are of considerable lateral extent so that the cross-sectional area of the passage 29 therebetween is at least as large as the cross-sectional area of the bore 30 of tube 23, and may be larger if desired.

The flattened section 24 of the tubing of the conduit circuit 20 may, when formed of copper or brass and similar readily malleable, non-ferrous material, be distortable under the high internal fluid pressure that may be encountered in apparatus in which embodiments of the present invention may be employed to advantage, such as a tendency for the opposed side walls 27 and 28 to bow out away from each other to cause the cross-section of this portion to approach a circular section. This hazard is amplified when the walls are kept thin to minimize poles' spacing for best results. In accordance with the present invention, means are provided to prevent such spreading distortion of the opposed side walls 27 and 28 of the conduit section 24. As diagrammatically proposed in Figs. 1 and 2, this may be accomplished by biasing the magnetic poles 25 and 26 toward each other by suitable abutment means, such as those diagrammatically illustrated at 31 and 32, to hold the magnet poles 25 and 26 in fixed relation with respect to each other.

Employment of the valving assembly and its operation may be best understood by reference to Fig. 4, wherein is illustrated parts of a dashpot type of shock absorber which may be used in automobiles, etc. As indicated in Figs. 4 and 5, the shock absorber system may include at 21 a dashpot serving as the work unit and comprising a closed cylinder 33 in which a piston 34 is slidably mounted. Piston 34 is carried upon a shaft or rod 35 extending through end walls 36, 36 by means of gasket units or glands 37, 37, for relative sliding motion without undue leakage of liquid. The rod 35 may be suitably provided with an eye 38 for suitable linkage to the usual remaining mechanism of a shock absorber device (not shown).

Suitable lengths of tubing 23, 23 connect opposite ends of the interior of cylinder 33 to opposite ends of the valving section 24. The flattened opposed walls 27 and 28 of the conduit section 24 are juxtaposed by the poles 25 and 26 of an electric-magnet 39. The core of the electric-magnet 39 may comprise a stack of laminations each of which is C-shaped, as shown, with each leg thereof terminating in one of the poles 25 and 26, and with its midportion 40 providing a core about which electrical coil 41 is disposed. Coil 41 is suitably connected into an electrical circuit 42. The electrical circuit 42 may include in series the car battery diagrammatically indicated at 43, a switch 44, an adjustable rheostat 45 for altering and controlling the strength of the magnetic field developed across the conduit section 24 between the poles 25 and 26, and the coil 41.

The biasing abutment means diagrammatically indicated at 31 and 32 in Figs. 1 and 2 are provided in the Figs. 4 and 5 embodiment by a clamping or tying structure comprising a pair of stiff straps or plates 46, 46 respectively disposed along the outer edges of the laminations of the two magnet poles 25 and 26 and suitably tied together by tie bolts 47—47. The abutment plates or straps 46, 46 and the tie bolts 47—47 which hold them together prevent spread of the C-shaped core 39 at the poles 25 and 26 when high pressure is developed between the opposed walls 27 and 28 of the conduit section 24.

In operation of the embodiment illustrated in Figs. 4 and 5, when the dashpot unit comprising the cylinder 33, the piston 34 and piston rod 35 are suitably installed in an automobile as a shock absorber mechanism, the driver may energize the same by closing the switch 44 and adjusting the rheostat 45 to that setting which will assure a desired predetermined resistance to force applied to the rod in either direction. With energization of the electro-magnetic coil 41 a relatively small magnetic field of force or magnetic flux is set up between poles 25 and 26 which traverses at right angles the path of flow of magnetic fluid through the conduit section 24. One familiar with the work of Rabinow and the teachings of his U. S. Patent No. 2,575,360 will understand that a mixture of a liquid and discrete fine paramagnetic particles may be caused to have different apparent viscosities when the liquid mixture is subjected to the influence of a relatively small magnetic field of varied intensity. Thus with energization of the electro-magnet of the control valve assembly 22, flow of the paramagnetic particles-carrying liquid from one side of the piston cylinder 34 to the other side thereof through conduits 23, 23 and the section 24 will be checked in the passage 29 by virtue of the increased apparent viscosity. Such checking of the flow in the closed conduit system 20, of course, results in the development of resisting high pressure behind the piston 34 on the side thereof constituting its head end when force is applied and motion is transmitted thereto by the usual linkage mechanism connected to the rod 35. The liquid medium preferably comprises a suitable thixotropic oil as the base liquid in which are suspended fine particles of paramagnetic material, such as iron powder. In the presence of a magnetic field, the iron particles appear to form chains along the lines of magnetic flux and crowd together. Such chains extending across a flow path will resist flow; and the massiveness of the chains, a direct function of the flux density, determines the degree of flow resistance. This action gives the effect of a change of viscosity of the liquid medium as it flows through the valving section 24 under the influence of pressure applied by the loaded piston 34. Thus rate of flow of liquid medium through the magnetic valve assembly 22 of the present invention may be determined by the flux density which in turn is determinable and controlled by the rheostat 45. It will be noted that the lines of magnetic flux which extend between the opposed faces of the magnetic poles 25 and 26 are substantially perpendicular to the path of flow of particles-laden liquid through the passage 29. As a consequence the checking or varying of flow by seeming increase or change of the viscosity of the liquid medium is alike in opposite directions. This is in clear distinction to attempts magnetically to valve flow of such liquid medium through a conduit by wrapping about a section thereof an electrical coil since the latter will effect a checking of the flow in only one direction, i. e., the direction in opposition to the parallel lines of flux as they pass through the coil center (and thus along the interior of the conduit) from the "south" end to the "north" end of the coil.

As is illustrated in Figs. 4 and 5, the axis of the valving section 24 is oriented to a substantially horizontal position to avoid during periods of electrical coil deenergization an uneven settling out of the paramagnetic particles as would deleteriously affect efficient valving operation upon reenergization. With the valving section 24 arranged substantially horizontal, any settling of the iron particles results in substantially even collection thereof along the bottom side of the pinched or flattened portion of the valving section of the conduit to be almost instantaneously rearranged thereacross in suspension upon the recreation of the traversing magnetic field and in substantially uniform distribution throughout the passage 29. In vertical orientation of the passage 29, the settled iron particles will tend to collect into the lower portion of tubing 23 out of the field of influence between the poles 25 and 26. Further, it will be noted that any tendency for the relatively high fluid pressure developed in the closed conduit system by the application of a load to the piston rod 35 to expand the flattened portion of the tubing in the section 24 to the simulation of a cylinder is effectively resisted by the abutment biasing or tying together of the magnet poles 25 and 26 with the clamping structure comprising the plates 46, 46 and tie bolts 47—47.

As illustrated in Figs. 6 and 7, the biasing abutment or tying means may, if desired, intervene the magnet poles and the flow tube or duct section. As therein illustrated, the magnet poles 125 and 126 may have their opposed faces provided with notches 48—48 in which may be disposed or seated a series of transverse bars 49—49, with the ends of the set thereof in the notches of one pole face being mounted beneath or to the inner sides of laterally-spaced, longitudinally-extending anchoring straps or bars 50—50. As shown in Figs. 6 and 7, tie rods 147—147 connect or tie the bars or straps 50—50 of the two sets together to clamp the flattened portion of the conduit section 24 against any tendency for pressure expansion.

As illustrated at 222 in Figs. 8 and 9, the valving assembly may comprise a pair of mating castings or forgings 51, 51 of non-magnetic material, such as brass or aluminum. As therein shown, the conduit section 124 may comprise castings 51, 51 which are of like construction, each consisting of a dished half-section having a substantially flat side wall 52 flanked by side walls 53, 53. Preferably each dished unit also has a pair of longitudinally-extending fins or ribs 54, 54 with those of one abutted against those of the other and preferably brazed or otherwise tied together for the purpose of strengthening or bracing the assembled casting and to serve the function of the biasing abutment means illustrated in either Figs. 4 or 6. All of those forms thus feature means fixedly tying opposed side walls of the valving conduit section together.

In Figs. 10 and 11 is shown a further embodiment 322 of the valving assembly of the present invention. In this form the conduit section 224 comprises a cylindrical tubular portion 55 of greater diameter than the tubing 23 to which its ends are connected, such as by brazing or welding as in the other embodiments, and one end connection may, if desired, include an elbow 56 to which tubing 23 is connected. Axially of the tubular portion 55 is mounted a cylindrical core or slug 57 of paramagnetic material held in position by a pair of diametrically located lands, supporting stools or spacers 58, 58 of diamagnetic material, such as brass, from which the cylindrical portion 55 may also be formed. The core 57 and the supporting lands 58, 58 define with the inner wall 59 of the tubular portion 55 a pair of diametrically opposed fluid passages 60, 60, the sum of the cross-sectional areas of which is at least as large as or, if desired, larger than the cross-sectional area of the duct 30 provided by the tubing 23, 23. An electro-magnet core 139 may comprise a plurality of juxtaposed C-shaped laminations, each having opposed poles 225 and 226. The opposed faces 61, 61 of the poles 225 and 226 are arcuate as shown in Fig. 11 so as to be juxtaposed to the cylindrical outer surface of the cylindrical section 55. The magnet poles 225 and 226 are located opposite the passages 60, 60 so that the latter will intervene the core 57 and the juxtaposed pole.

In operation of the embodiment shown in Figs. 10 and 11, the core 57 serves as a way station or collector for the lines of magnetic flux which will extend between the poles 225 and 226 when the electrical coil 41 is energized. The lines of flux will extend from one pole radially through the adjacent passage 60 to the core 57, then diametrically across the latter and radially across the other passage 60 to the other pole. Accordingly viscosity of the particles-laden liquid flowing through passages 60, 60 will be altered by a magnetic field, the lines of flux of which extend substantially normally to the paths of flow. The use of the core 57 assures relatively short paths of travel of the lines of magnetic flux through the liquid, as is the case of the other embodiments wherein the valving section of tubing is flattened to attain maximum effect of the magnetic field effecting the valving.

In the Figs. 10 and 11 embodiment, the diamagnetic portions of the paths of the flux lines are constituted by flow passages 60, 60, the thicknesses of the walls of tube section 55 and any small air spaces which may intervene tube 55 and the concave pole faces 61, 61. Since their transverse boundaries are defined by arcs of coincident circles the radial depths of the flow passages 60, 60 are equal at all points and those diamagnetic portions of the flux paths are equal with the reluctances of the latter being substantially equal. Further the spacing between those portions of the opposed pole faces 61, 61 at the localities of closest approach preferably is greater than the lengths of the diamagnetic portions of the flux paths to assure a greater reluctance so as to minimize by-passing ineffectiveness of flux lines.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Valve mechanism for magnetic fluid conduits comprising, in combination, a conduit providing a fluid passage and having a duct section of diamagnetic material through which magnetic fluid medium is to flow, said duct section being flattened so as relatively closely to space opposed side wall portions thereof with the cross-sectional area of the flow space between said opposed side wall portions being at least about as large as the cross-sectional area of the passage through the remainder of said conduit to avoid physical throttling of flow through said duct section, and an electro-magnet having opposed magnet poles juxtaposed to said opposed side wall portions of said duct section on opposite sides of the latter for traverse of the path of flow defined by said duct section by flux lines substantially normal to this path, the length of flux line paths between the faces of said opposed poles being thereby minimized.

2. The valve mechanism as defined in claim 1 characterized by means tying said opposed side wall portions together to prevent internal fluid pressure separating them.

3. The valve mechanism as defined in claim 2 characterized by said tying means connecting said opposed magnet poles together whereby the latter serve as abutment means biasing said opposed side wall portions toward each other.

4. The valve mechanism as defined in claim 3 characterized by said magnet poles comprising parts of a C-shaped core structure, and said tying means comprising strap means located to the outer edges of said C-shaped core structure beyond said opposed poles and means tying said strap means together.

5. The valve mechanism as defined in claim 1 characterized by said flow space in at least a portion of said flattened duct section being subdivided by cross bracing means.

6. Valve mechanism for magnetic fluid conduits comprising, in combination, a conduit providing a fluid passage and having a duct section of diamagnetic material through which magnetic fluid medium is to flow, said duct section having a flow space extending therethrough which is of a cross-sectional area at all points at least about as large as the cross-sectional area of the passage through the remainder of said conduit to avoid physical throttling of flow through said duct section, said duct section being of a shape and construction at at least one locality which there reduces the transverse distance across the flow space between opposed side wall portions thereof to appreciably less than that transversely across between opposed side wall portions of the remainder of said conduit, and an electro-magnet having opposed magnet poles juxtaposed to said opposed side wall portions of said duct section at said locality for traverse of the path of flow defined by said duct section by flux lines substantially normal to this path, the length of flux line paths between the faces of said opposed poles being thereby minimized.

References Cited in the file of this patent

UNITED STATES PATENTS

| | | |
|---|---|---|
| 1,457,328 | Van Berkel | June 5, 1923 |
| 1,643,262 | Steiner | Sept. 20, 1927 |
| 1,747,044 | Bainbridge | Feb. 11, 1930 |
| 2,505,049 | Keller | Apr. 25, 1950 |
| 2,651,258 | Pierce | Sept. 8, 1953 |
| 2,661,596 | Winslow | Dec. 8, 1953 |
| 2,670,749 | Germer | Mar. 2, 1954 |